US009278307B2

(12) United States Patent
Lehrer et al.

(10) Patent No.: US 9,278,307 B2
(45) Date of Patent: Mar. 8, 2016

(54) SYNERGISTIC H₂S SCAVENGERS

(71) Applicants: Scott E. Lehrer, The Woodlands, TX (US); Sunder Ramachandran, Sugar Land, TX (US); Vladimir Jovancicevic, Richmond, TX (US)

(72) Inventors: Scott E. Lehrer, The Woodlands, TX (US); Sunder Ramachandran, Sugar Land, TX (US); Vladimir Jovancicevic, Richmond, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 289 days.

(21) Appl. No.: 13/900,269

(22) Filed: May 22, 2013

(65) Prior Publication Data

US 2013/0320258 A1    Dec. 5, 2013

Related U.S. Application Data

(60) Provisional application No. 61/652,515, filed on May 29, 2012.

(51) Int. Cl.
*B01D 53/14* (2006.01)

(52) U.S. Cl.
CPC ........ *B01D 53/1493* (2013.01); *B01D 53/1468* (2013.01); *B01D 2252/20426* (2013.01); *B01D 2252/504* (2013.01); *B01D 2257/304* (2013.01); *B01D 2257/306* (2013.01)

(58) Field of Classification Search
None
See application file for complete search history.

(56) References Cited

U.S. PATENT DOCUMENTS

| | | | |
|---|---|---|---|
| 1,783,901 A | 12/1930 | Bottoms | |
| 1,991,765 A | 2/1935 | Marks | |
| 2,496,596 A | 2/1950 | Moyer et al. | |
| 2,550,446 A | 4/1951 | Blohm et al. | |
| 2,596,273 A | 5/1952 | Moyer et al. | |
| 2,596,425 A | 5/1952 | Moyer et al. | |
| 2,701,450 A | 2/1955 | Duncan | |
| 2,712,978 A | 7/1955 | Blohm et al. | |
| 2,718,454 A | 9/1955 | Wylie | |
| 2,731,393 A | 1/1956 | Arundale et al. | |
| 2,761,818 A | 9/1956 | Draemel et al. | |
| 2,776,870 A | 1/1957 | Fischer | |
| 2,860,030 A | 11/1958 | Goldtrap et al. | |
| 3,120,993 A | 2/1964 | Thormann et al. | |
| 3,266,866 A | 8/1966 | Bally et al. | |
| 3,347,621 A | 10/1967 | Papadopoulos et al. | |
| 3,387,917 A | 6/1968 | Walles et al. | |
| 3,420,633 A | 1/1969 | Lee | |
| 3,463,603 A | 8/1969 | Freitas et al. | |
| 3,502,428 A | 3/1970 | Gelbein et al. | |
| 3,516,793 A | 6/1970 | Renault | |
| 3,791,974 A | 2/1974 | Borchert | |
| 3,928,211 A | 12/1975 | Browning et al. | |
| 4,246,243 A | 1/1981 | Fox | |
| 4,436,713 A | 3/1984 | Olson | |
| 4,443,423 A | 4/1984 | Olson | |
| 4,680,127 A | 7/1987 | Edmondson | |
| 4,748,011 A | 5/1988 | Baize | |
| 4,892,719 A | 1/1990 | Gesser | |
| 4,894,178 A | 1/1990 | Ho et al. | |
| 4,978,512 A | 12/1990 | Dillon | |
| 5,000,835 A * | 3/1991 | Taylor et al. ................... 208/39 |
| 5,074,991 A | 12/1991 | Weers et al. | |
| 5,085,842 A | 2/1992 | Porz et al. | |
| 5,128,049 A | 7/1992 | Gatlin | |
| 5,152,916 A | 10/1992 | Hoffmann et al. | |
| 5,169,411 A | 12/1992 | Weers | |
| 5,190,640 A | 3/1993 | Roof et al. | |
| 5,314,672 A | 5/1994 | Vasil | |
| 5,347,004 A | 9/1994 | Rivers et al. | |
| 5,462,721 A | 10/1995 | Pounds et al. | |
| 5,480,860 A | 1/1996 | Dillon | |
| 5,488,103 A | 1/1996 | Gatlin | |
| 5,554,349 A | 9/1996 | Rivers et al. | |
| 5,674,377 A | 10/1997 | Sullivan, III et al. | |
| 5,688,478 A | 11/1997 | Pounds et al. | |
| 5,698,171 A | 12/1997 | Trauffer et al. | |
| 5,744,024 A | 4/1998 | Sullivan, III et al. | |
| 5,958,352 A | 9/1999 | Callaway et al. | |
| 6,024,866 A | 2/2000 | Weers et al. | |

(Continued)

FOREIGN PATENT DOCUMENTS

EP    0411745 A1    2/1991
GB    2290542 A     1/1996

OTHER PUBLICATIONS

Derwent Abstract 115:95451c (1991) of S.P. Von Halasz et al., Erdoel, Erdgas, Kohle 1991, 105(5), pp. 215-220 (German).

(Continued)

*Primary Examiner* — Tanisha Diggs
(74) *Attorney, Agent, or Firm* — Mossman Kumar & Tyler PC

(57) ABSTRACT

The use of a composition that includes a metal salt and an oil soluble amine formaldehyde reaction product scavenges H₂S that is present in aqueous fluids (e.g. produced water liquid streams), natural gas and in oil and mixtures thereof (e.g. mixed production streams that contain all three phases) better than either component when used alone. The resulting scavenger combination significantly increases the reaction rate and the overall scavenging efficiency, i.e. capacity over each component when used alone, in the same total amount. Non-limiting examples of the metal salt include zinc or iron carboxylates, and a non-limiting example of an oil soluble amine formaldehyde reaction product is the reaction product of dibutylamine with formaldehyde.

8 Claims, 2 Drawing Sheets

(56) References Cited

U.S. PATENT DOCUMENTS

| | | |
|---|---|---|
| 6,582,624 B2 | 6/2003 | Titley et al. |
| 6,599,472 B1 | 7/2003 | Hudson |
| 6,663,841 B2 | 12/2003 | Salma et al. |
| 2005/0153846 A1* | 7/2005 | Gatlin .......................... 507/239 |
| 2005/0238556 A1 | 10/2005 | Pakulski et al. |
| 2005/0250666 A1 | 11/2005 | Gatlin et al. |
| 2009/0065445 A1 | 3/2009 | Westlund et al. |
| 2011/0139686 A1* | 6/2011 | Compton et al. ............. 208/239 |
| 2011/0271835 A1 | 11/2011 | Westlund et al. |
| 2012/0088697 A1 | 4/2012 | Gatlin et al. |

OTHER PUBLICATIONS

Buller, J. et al., "H2S Scavengers for NonAqueous Systems," SPE 93353, paper presented at the 2005 SPE International Symposium on Oilfield Chemistry, Houston, Texas Feb. 2-4, 2005.

* cited by examiner

SYNERGISTIC H₂S SCAVENGERS

CROSS-REFERENCE TO RELATED APPLICATION

This application claims the benefit of U.S. Provisional Patent Application No. 61/652,515 filed May 29, 2012, incorporated herein by reference in its entirety.

TECHNICAL FIELD

The present invention relates to methods and compositions for scavenging $H_2S$ and/or mercaptans from fluids, and more particularly relates, in one non-limiting embodiment, to methods and compositions for scavenging $H_2S$ and/or mercaptans from fluids using a metal salt and an oil soluble amine formaldehyde reaction product.

TECHNICAL BACKGROUND

In the drilling, downhole completion, production, transport, storage, and processing of crude oil and natural gas, including waste water associated with crude oil and gas production, and in the storage of residual fuel oil, $H_2S$ and/or mercaptans are often encountered. The presence of sulfur-containing species such as $H_2S$ and mercaptans is objectionable because they often react with other hydrocarbons or fuel system components. Another reason that the $H_2S$ and mercaptans are objectionable is that they are often highly corrosive. Still another reason that $H_2S$ and mercaptans are undesirable is that they have highly noxious odors. The odors resulting from $H_2S$ and mercaptans are detectable by the human nose at comparatively low concentrations and are well known. For example, mercaptans are used to odorize natural gas and used as a repellant by skunks and other animals.

The predominant $H_2S$ and mercaptan scavengers for natural gas and crude oil are water soluble monoethanolamine (MEA) triazines and monomethylamine (MMA) triazines. These compounds contain nitrogen and when used in sufficient concentration may cause problems for certain refineries. Glyoxal ($C_2H_2O_2$) or acrolein ($C_3H_4O$) have been used as $H_2S$ scavengers in instances where a nitrogen-containing $H_2S$ scavenger is not desired. Glyoxal is a slow acting scavenger and may be corrosive to mild steel. Acrolein is an effective scavenger but an extremely toxic substance which operators do not like to use.

Oil soluble amine formaldehyde reaction products such as the dibutylamine/formaldehyde reaction product have been used previously as hydrogen sulfide scavengers. The generic structure of oil soluble amines is given below:

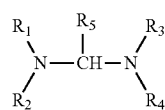

(I)

wherein $R_1$, $R_2$, $R_3$ and $R_4$ may be independently a saturated or unsaturated hydrocarbon group, e.g., alkyl, aryl, alkylaryl, alkaryl, cycloalkyl, alkenyl, aralkenyl, alkenylaryl, cycloalkenyl, and the like or heterocyclyl groups and $R_5$ may be hydrogen or lower alkyl.

It would be desirable if a new class of $H_2S$ and mercaptan scavengers could be discovered which is very effective, but which is more efficient and increases the reaction rate as compared with prior scavengers.

SUMMARY

There is provided in one non-limiting embodiment a composition for synergistically scavenging hydrogen sulfide and/or mercaptans from a fluid, the composition comprising at least one metal salt; and at least one oil soluble amine formaldehyde reaction product.

There is additionally provided in one non-restrictive version, a method for scavenging sulfur-containing species, including hydrogen sulfide and/or mercaptans, from a fluid selected from the group consisting of an aqueous phase, a gaseous phase, a hydrocarbon phase and mixtures thereof. The method involves contacting the fluid with a composition in an effective amount for synergistically scavenging hydrogen sulfide and/or mercaptans. Again, the composition includes at least one metal salt, and at least one oil soluble amine formaldehyde reaction product.

Synergistically scavenging is defined as where the amount of hydrogen sulfide and/or mercaptans scavenged is greater as compared with the amount scavenged using a composition of the sum of the components when used separately. Alternatively, synergistically scavenging is defined as the amount of hydrogen sulfide and/or mercaptans scavenged being greater as compared with a composition where either the metal salt or the oil soluble amine formaldehyde reaction product is absent Any of these methods may optionally include corrosion inhibitors such as phosphate esters, sulfur-oxygen phosphates or polyphosphate esters and the like.

DETAILED DESCRIPTION

Figure 1:
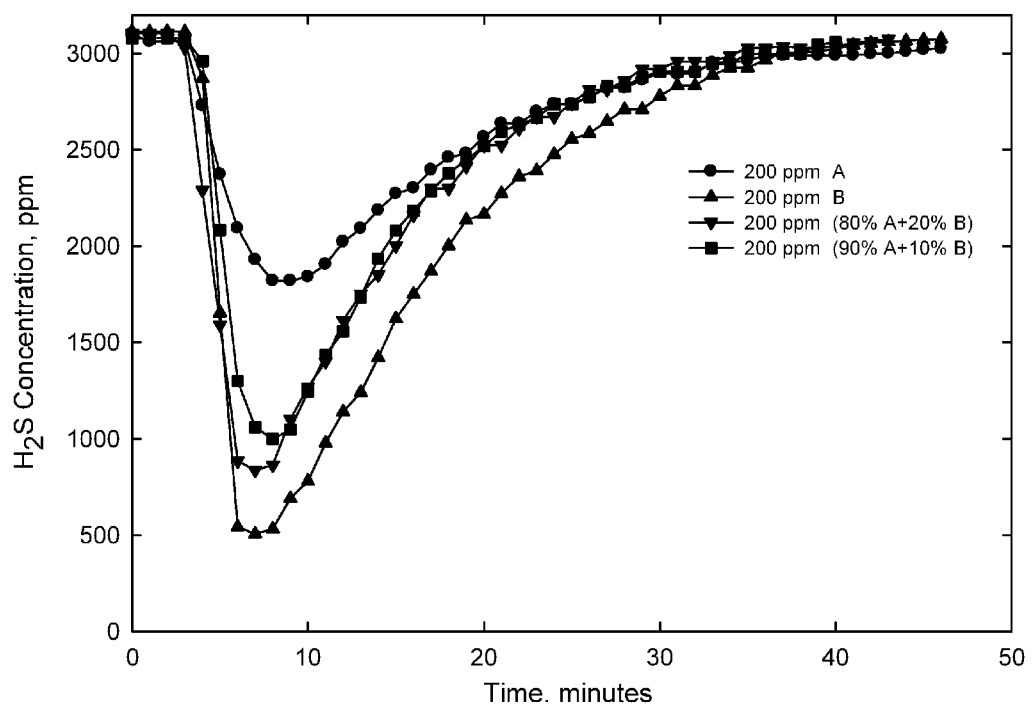
FIG. 1 is a graph of the drop in $H_2S$ concentration as a function of time for different $H_2S$ scavenger component compositions.

It has been surprisingly discovered that combinations of metal salts and oil soluble amine formaldehyde reaction products remove hydrogen sulfide present in natural gas and in oil more completely and faster than the sum of the components at their concentrations in the mixture when used separately, and is thus also expected to remove mercaptans from these fluids as well in a similar way. The process by which the hydrogen sulfide is effectively removed from gas, water or oil, or combinations thereof, involves introducing a synergistic combination of a metal salt and an oil soluble amine formaldehyde reaction product into the $H_2S$-containing system. The synergistic scavenger combination significantly increases the reaction rate and the overall scavenging efficiency over the sum of the components used in the mixture separately, but at the same total amount. The synergy may be seen from the data discussed below.

In specific applications to remove $H_2S$ from crude oil, the hydrogen sulfide/mercaptan scavenger may be introduced in the crude oil (or other fluid) at concentrations from about 10 independently to about 10,000 ppm, in a different embodiment from about 25 independently to about 7,500 ppm, alternatively from about 50 independently to about 5,000 ppm. The term "independently" when used in connection with a range means that any lower threshold may be combined with any upper threshold to give a valid alternative range.

It is expected that most metal salts may find at least some utility in the $H_2S$/mercaptan scavenger compositions described herein. However, to give a better understanding, in one non-limiting embodiment, the metal salts may be metal carboxylates where the metal is selected from the group consisting of zinc, iron, copper, magnesium and/or molybdenum, and where the carboxylic acid used to make the salts are the same or different from each other, and may have from two to 18 carbon atoms. Other specific examples of suitable metal salts include, but are not necessarily limited to, zinc chloride, zinc acetate, zinc octoate, a zinc salt containing at least one hydrocarbyl group of at least four carbon atoms, zinc di-(neoalkyl)-phosphorodithioate, zinc 2-ethylhexyl isopropyl phosphorodithioate, zinc dihydrocarbyldithiophosphates (ZDDP), zinc hydrocarbyl phosphate, zinc ethyl hexanoate, copper salts, iron chloride, iron carboxylates, iron neocarboxylates, iron naphthenates, ferrocene, magnesium carboxylates, molybdenum metal salts, and combinations thereof. One specific suitable example is zinc octoate. In one non-limiting embodiment the metal salts are oil soluble, but it is expected that water soluble (aqueous soluble) metal salts are also useful.

It is also expected that many oil soluble amine formaldehyde reaction products will be suitable components in the $H_2S$/mercaptan scavenger compositions described herein. But again, to give better understanding, specific examples of suitable oil soluble amine formaldehyde reaction products include, but are not necessarily limited to, those made by reacting formaldehyde with a secondary amine of the formula $R_1R_2$—NH where $R_1$ and $R_2$ is a hydrocarbyl group having at least four carbon atoms. More specifically, $R_1$ and $R_2$ may be a straight or branched alkyl, aryl or alkaryl group having at least four carbon atoms. In another non-limiting embodiment, the secondary amine has the structure of formula (I), where $R_1$, $R_2$, $R_3$ and $R_4$ may be independently a saturated or unsaturated alkyl, aryl, alkylaryl, alkaryl, cycloalkyl, alkenyl, aralkenyl, alkenylaryl, cycloalkenyl, or heterocyclyl groups, each having two or more carbon atoms, and where $R_5$ is hydrogen or lower alkyl, defined as having from one to four carbon atoms. Amine formaldehyde reaction products made from secondary amines of formula (I) should be oil soluble. Further, there may be a few percent of unreacted amine present since excess amine is usually always present to ensure that there is not residual formaldehyde. One specific suitable example is the condensate of dibutylamine with formaldehyde.

In one non-limiting embodiment, the amount of weight ratio of metal salt in the total composition with the oil soluble amine formaldehyde reaction product (not accounting for any solvent) ranges from about 0.0001 wt % independently to about 99 wt %, alternatively from about 0.01 independently to about 30 wt % metal salt. The oil soluble amine formaldehyde reaction product comprises the balance. Stated another way, the weight ratio of oil soluble amine formaldehyde reaction product (in a hydrocarbon solvent) to metal salt (in a hydrocarbon solvent) ranges from about 95/5 independently to 75/25, alternatively from about 90/10 independently to about 80/20. These latter weight ratios assume about 30 wt % hydrocarbon solvent in each component taken separately.

The suitable solvents for the $H_2S$/mercaptan scavenger compositions herein include, but are not necessarily limited to, Aromatic 100, ISOPAR M, kerosene, mineral oil, alcohols, glycols, and mixtures thereof.

It has been discovered that oil soluble $H_2S$/mercaptan scavenger compositions work best in brine solutions while water soluble $H_2S$/mercaptan scavenger compositions work best in non-aqueous or oil solutions. This occurs because the reaction is a heterogeneous reaction for the case of the $H_2S$/mercaptan scavenger compositions in water. The actual concentration of the scavenger within the oil droplets in a water or brine solution is relatively high.

It has been surprisingly discovered that the amount of hydrogen sulfide and/or mercaptans scavenged is greater as compared with an otherwise identical composition with respect to metal salt, where the oil soluble amine formaldehyde reaction product is absent and vice versa. This effect is true for the same total amount of active component.

It has been found that oil-soluble formulations of these compounds act as hydrogen sulfide and/or mercaptan scavengers when the hydrogen sulfide and/or mercaptan is present in the aqueous phase, the gaseous phase and a hydrocarbon phase. These methods and compositions may be used to remove hydrogen sulfide and/or mercaptans present in natural gas produced from natural gas wells. They may also be used to remove hydrogen sulfide and/or mercaptans from crude oil. Additionally they may be used to remove hydrogen sulfide and/or mercaptans from brines and other aqueous solutions containing them. Stated another way, the scavenging composition is expected to remove hydrogen sulfide and/or mercaptans in hydrocarbon gas streams, hydrocarbon liquid streams, produced water liquid stream and/or mixed production streams that contain all three phases.

More specifically, the $H_2S$/mercaptan scavengers are expected to be useful in a wide variety of applications, particularly "upstream" and "downstream" applications (downstream of a refinery) including, but not necessarily limited to, residual fuel oil, jet fuel, bunker fuel, asphalt, recovered aqueous streams, crude oil, tar oil derived from coal, bitumen, as well as mixed production streams, for instance downhole or downstream of wellhead, including, but not limited to scavenging $H_2S$ and mercaptans from production fluids. Another suitable application may be to remove hydrogen sulfide from a hydrogen stream, and the like. In one non-limiting embodiment the method is practiced in a refinery. The primary applications within a refinery involve hydrocarbon liquid phases and hydrocarbon gaseous phases.

When the method scavenges $H_2S$ and/or mercaptans from a gaseous phase, the method may be practiced by contacting the gaseous phase with droplets of the composition, and/or passing the gaseous phase through the composition, such as by bubbling through a tower.

The scavenging compositions described herein may also include corrosion inhibitors including, but not necessarily limited to, phosphate esters, acetylenic alcohols, fatty acids and/or alkyl-substituted carboxylic acids and anhydrides, phosphates esters and/or polyphosphate esters, quaternary ammonium salts, imidazolines, and combinations thereof.

The invention will now be illustrated with respect to certain examples which are not intended to limit the invention in any way but simply to further illustrate it in certain specific embodiments.

EXAMPLE 1

A continuous gas flow apparatus was used to evaluate $H_2S$ scavenger performance. This apparatus involved the sparging of a given composition of gas containing hydrogen sulfide in a vessel containing a liquid hydrocarbon. In the tests the liquid was heated at 75° C. and the pressure was 1 atm (0.1 MPa). The initial concentration of $H_2S$ in the hydrocarbon was 3,000 ppm and the hydrocarbon contained 2 wt % $CO_2$. The concentration of $H_2S$ gas exiting the vessel was measured. A set total amount of $H_2S$ scavenger was injected (200 ppm). The experiments were performed using following solutions:

A: (dibutylamine formaldehyde condensate in a hydrocarbon solvent)

B: (zinc octoate in a hydrocarbon solvent)

The drop of $H_2S$ concentration is recorded in ISOPAR M as a function of time for 200 ppm of A, 200 ppm A+B (80% A and 20% B), 200 ppm A+B (90% A and 10% B) and 200 ppm of solution B is shown in FIG. 1. Percentages are wt %.

Figures 2, 3:
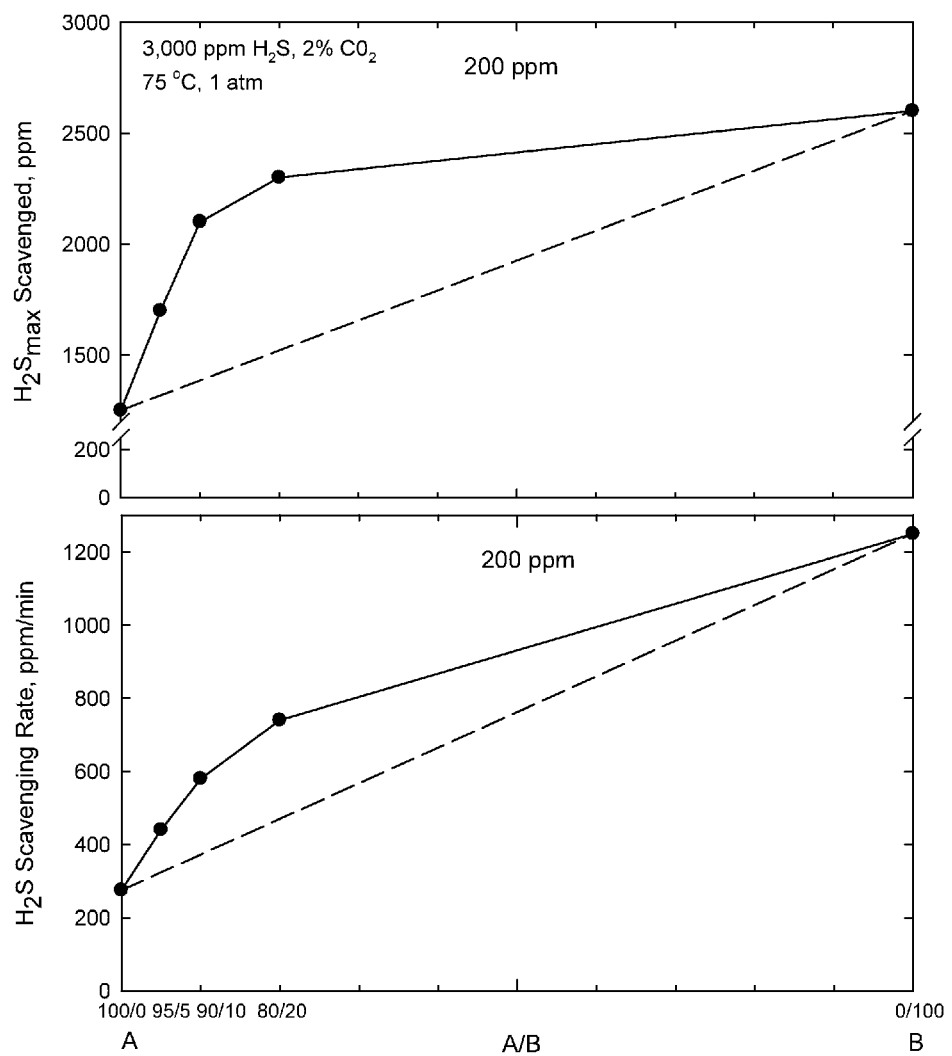
FIG. 2 is a graph showing the results of a $H_2S$ uptake test showing maximum $H_2S$ scavenged as a function of various weight ratios of dibutylamine formaldehyde condensate to zinc octoate.
FIG. 3 is graph showing $H_2S$ scavenging rates as a function of various weight ratios of dibutylamine formaldehyde condensate to zinc octoate.

The results can be described in terms of maximum $H_2S$ scavenged and $H_2S$ scavenging rate for various ratios of component A and component B as shown in FIGS. 2 and 3, respectively. FIG. 2 presents the maximum $H_2S$ scavenged and FIG. 3 presents the $H_2S$ scavenging rate for the different ratios of amine/formaldehyde reaction product (A) and zinc carboxylate (B). The hydrocarbon solvent used was ISOPAR M. It may be seen clearly that the combinations of A and B show synergistic behavior when compared with the pure components and the sum of the components in the mixture. That is, the straight, dashed line in FIGS. 2 and 3 is what would be expected if there was linear behavior in the change from a mixture of only A as the active component to only B as the active component. Instead, better results are obtained with the compositions on the left side of each graph than would be expected from the simple additive effect of using the two components in a total amount that is the same as either component used separately.

In the foregoing specification, the invention has been described with reference to specific embodiments thereof, and has been demonstrated as effective in providing methods and compositions for scavenging $H_2S$ and/or mercaptans from aqueous fluids, hydrocarbon fluids, gaseous phases and/or combinations thereof. However, it will be evident that various modifications and changes can be made thereto without departing from the broader spirit or scope of the invention as set forth in the appended claims. Accordingly, the specification is to be regarded in an illustrative rather than a restrictive sense. For example, specific metal salts, oil soluble amine formaldehyde reaction products, amine reactants, and solvents falling within the claimed parameters, but not specifically identified or tried in a particular composition or method, are expected to be within the scope of this invention.

The words "comprising" and "comprises" as used throughout the claims is interpreted as "including but not limited to".

The present invention may suitably comprise, consist or consist essentially of the elements disclosed and may be practiced in the absence of an element not disclosed. For instance, in a method for scavenging hydrogen sulfide and/or mercaptans from a fluid selected from the group consisting of an aqueous phase, a gaseous phase, a hydrocarbon phase and mixtures thereof, the method may consist of or consist essentially of contacting the fluid with a composition in an effective amount for synergistically scavenging hydrogen sulfide and/or mercaptans, where the composition consists of or consists essentially of at least one metal salt and at least one oil soluble amine formaldehyde reaction product, where synergistically scavenging is defined as the amount of hydrogen sulfide and/or mercaptans scavenged is greater as compared with a composition where either the metal salt or the oil soluble amine formaldehyde reaction product is absent.

Alternatively, in a composition for scavenging hydrogen sulfide and/or mercaptans from a fluid, the composition may consist of, or consist essentially of, at least one metal salt and at least one oil soluble amine formaldehyde reaction product.

What is claimed is:

1. A method for scavenging hydrogen sulfide from a fluid selected from the group consisting of an aqueous phase, a gaseous phase, a hydrocarbon phase and mixtures thereof, the method comprising contacting the fluid with a composition in an effective amount for synergistically scavenging hydrogen sulfide, where the composition comprises:
   zinc octoate, and
   dibutylamine formaldehyde reaction product;
where synergistically scavenging is defined as the amount of hydrogen sulfide scavenged is greater as compared with an amount scavenged using a composition of the sum of the components when used separately.

2. The method of claim 1 where the composition comprises from about 0.0001 wt % to about 99 wt % metal salt, where the balance is dibutylamine formaldehyde reaction product.

3. The method of claim 1 where the effective amount of the composition present in the fluid is from about 10 to about 10,000 ppm.

4. The method of claim 1 where the method is practiced in a refinery.

5. The method of claim 1 where the method is practiced in upstream production.

6. A method for scavenging hydrogen sulfide from a fluid selected from the group consisting of an aqueous phase, a gaseous phase, a hydrocarbon phase and mixtures thereof, the method comprising contacting the fluid with from about 10 to about 10,000 ppm of a composition for synergistically scavenging hydrogen sulfide, where the composition comprises:
   from about 0.0001 wt % to about 99 wt % zinc octoate, and
   where the balance is dibutylamine formaldehyde reaction product;
where synergistically scavenging is defined as the amount of hydrogen sulfide scavenged is greater as compared with an amount scavenged using a composition of the sum of the components when used separately.

7. The method of claim 6 where the method is practiced in a refinery.

8. The method of claim 6 where the method is practiced in upstream production.

* * * * *